United States Patent

[11] 3,618,685

| [72] | Inventor | Owen Orlando Fiet |
| | | Redondo Beach, Calif. |
| [21] | Appl. No. | 89,313 |
| [22] | Filed | Nov. 13, 1970 |
| [45] | Patented | Nov. 9, 1971 |
| [73] | Assignee | TRW Inc. |
| | | Redondo Beach, Calif. |

[54] TEMPERATURE COMPENSATED ELECTROBALANCE
18 Claims, 5 Drawing Figs.

[52] U.S. Cl. .................................................. 177/207
[51] Int. Cl. .................................................. G01g 3/14
[50] Field of Search .................................. 177/207, 210, 226, 227, 228

[56] References Cited
UNITED STATES PATENTS

| 2,051,781 | 8/1936 | Brown | 177/210 X |
| 2,547,750 | 4/1951 | Hall | 177/210 X |
| 3,177,701 | 4/1965 | Geortler, Jr. | 177/210 X |

Primary Examiner—Richard B. Wilkinson
Assistant Examiner—George H. Miller, Jr.
Attorneys—Daniel T. Anderson, William B. Leach and Donald W. Graves ABSTRACT: An electrobalance device is provided which includes a beam pivotally mounted at a fulcrum point and further including means for suspending a buoyant body from the beam. The beam, fulcrum and suspended body form a counterbalance scale. A change in the weight suspended from the beam will case the beam to be unbalanced. The device further includes a photoelectric circuit for detecting any such beam unbalance or beam displacement and a servosystem for applying a counterbalancing torque to the beam to reduce the beam displacement toward zero. A current or voltage is used to produce the counterbalancing torque and is therefore a measure of the change in weight producing the unbalancing effect. Means are provided for maintaining the end of the beam at substantially equal temperature so as to enhance the measuring capabilities of the electrobalancing device.

Owen Orlando Fiet
INVENTOR.

BY William B. Leach

ATTORNEY

Owen Orlando Fiet
INVENTOR.

BY William B. Leach

ATTORNEY

TEMPERATURE COMPENSATED ELECTROBALANCE

BACKGROUND OF THE INVENTION

The invention relates generally to weight measuring systems and more specifically to electrobalance devices. In measuring devices of this type, a beam is generally pivotally mounted at a fulcrum point and has suspended from one end thereof a weighing pan. From the other end of the beam is suspended a counterbalancing weight. The material to be weighed is placed in the weighing pan thereby causing the beam to be angularly displaced about the fulcrum point. If the beam displacement is noted as by a displacement detector, a servomechanism may be utilized to apply to the beam a counterbalancing torque sufficient to return the beam to, or nearly to, a neutral or zero displacement position. An electrical voltage or current used to produce the counterbalancing torque is measured to provide an indication of the weight of the material being weighed. An electrobalance of this type is seen in the U.S. Pat. to Cahn, reissue No. 26,100.

Applicant has found that an electrobalance device of the foregoing type may be used in a vacuum chamber to obtain various data such as the density of a gas and to study the effects of such phenomena as sorption. This is accomplished by replacing the weighing pan of the electrobalance device with a light weight hollow sphere that will become buoyant in the gas whose density is to be measured. The weight suspended from the other end of the beam is used to counterbalance the weight of the sphere, but has minimum volume. If the electrobalance device, as modified, is placed in a vacuum chamber, the chamber evacuated, and a gas whose density is to be measured is introduced into the chamber, the hollow sphere will become buoyant thus reducing the weight applied to the beam and unbalancing the beam. The counterbalancing torque is then a measure of the buoyant force. It is well known that the buoyant force is a function of the density of the gas and the volume of the gas displaced. Since the volume of the sphere is known and the buoyant force is measured as described, the density of the gas may be determined.

It will be appreciated that the means for measuring the buoyant force must be extremely accurate. For many such applications, the buoyant force is in the order of magnitude of $10^{14}$ torr. Consequently, any source of error introduced into the measuring system will substantially affect the indicated buoyant force. Conversely, any error that may be eliminated will substantially improve the measuring characteristics of the system.

One such source of error is the means for detecting the displacement of the beam. This detection means typically includes a photoelectric circuit. A light source is positioned on one side of the beam near one end thereof and a light sensing device is placed on the opposing side of the beam. When the beam is in a neutral position, the beam interrupts, or substantially interrupts, the light traveling from the source towards the sensor. As the beam is displaced additional light from the source reaches the sensor and a sensor circuit produces a current or voltage representative of the amount of light detected. This is also a representation of the beam displacement and can be used to control the amount of counterbalancing torque applied to the beam. Such a displacement detection system is a source of heat which increases the temperature of the adjacent portions of the beam. The ends of the beam will therefore be at different temperatures. Thus, the moment arm from the fulcrum to the relatively high temperature will tend to be longer than the moment arm from the fulcrum to the relatively cooler end of the beam. The difference in moment arms will create an unbalancing torque. The servomechanism will note the resulting displacement of the beam and apply a counterbalancing torque to the beam thereby indicating falsely that a force or change is buoyant force is present. The electrobalance device of the present invention substantially eliminates this source of error.

SUMMARY OF THE INVENTION

An electrobalance device for measuring buoyant forces, for studying sorption effects, and for measuring weight is provided. The device includes a beam or arm member pivotally mounted at a fulcrum point and adapted for suspending a weight from either or both ends of the beam. Material may be added to or taken from that which is suspended from one end of the beam or forces applied thereto thus causing the beam to be angularly displaced about the fulcrum point. Detection means is included for noting the displacement of the beam and further included is a servomechanism for applying a counterbalance torque to the beam to reduce the displacement toward zero. Temperature detection means are associated with each end of the beam for detecting differential temperature conditions and is adapted for producing a signal representative of such a temperature difference. This signal is then used to control a heat generator associated with the other end of the beam and thereby to maintain the end of the beam at substantially equal temperatures.

It is an object of the present invention to provide an electrobalance device not subject to the disadvantages of the prior art.

Another object of the present invention is to provide an improved electrobalance device for measuring buoyant forces.

Yet another object of the present invention is to provide an electrobalance device which is not subject to errors in measurement due to temperature gradient.

It is a further object of the present invention to provide an electrobalance device which is not subject to errors in measurement due to thermal molecular flow effects arising from temperature gradients within the media surrounding the device.

Still a further object of the present invention is to provide temperature compensating means is an electrobalance device for determining the relative temperature at one portion of the electrobalance device and thereafter elevating the temperature of another portion of the electrobalance device to a like temperature.

The foregoing and other objects of the present invention will become more and better understood when taken in conjunction with the following description and accompanying drawings, throughout which like characters indicate like parts and which drawings form a part of this application.

DESCRIPTION OF THE PREFERRED EMBODIMENTS

Figure 1:
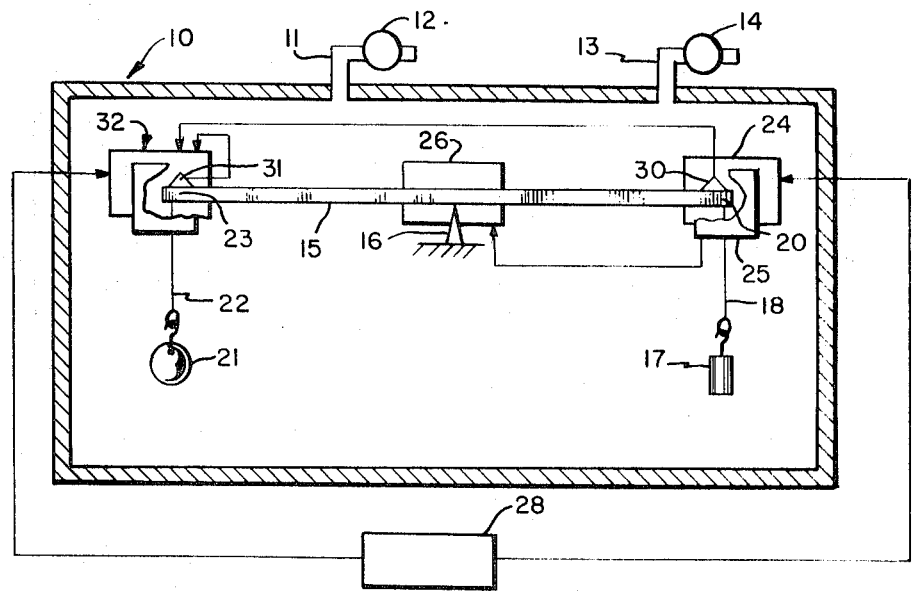
FIG. 1 is a view in elevation and partial cross section of the electrobalance device constructed in accordance with the principles of the present invention.
Figure 2:
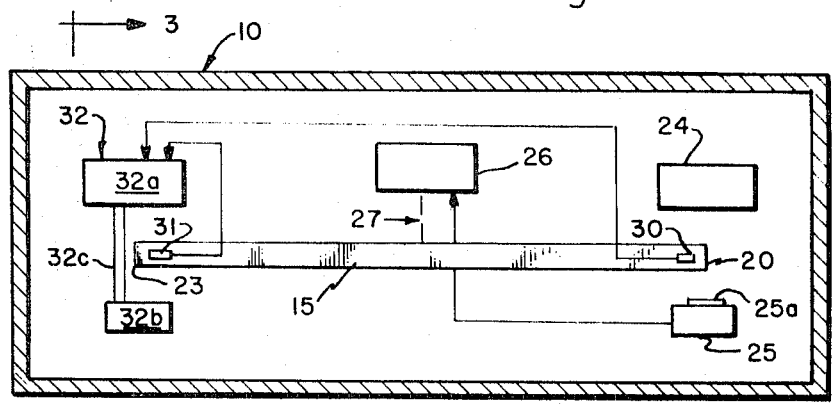
FIG. 2 is a planned view in partial cross section of the electrobalance device of FIG. 1.
Figure 3:
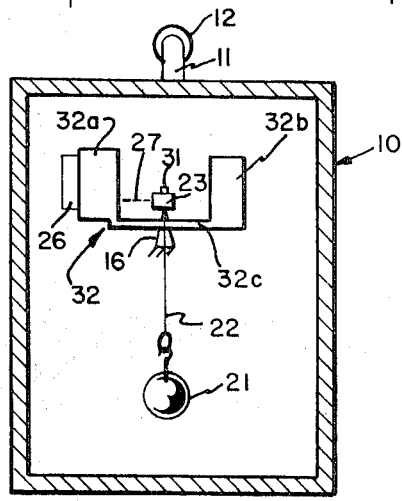
FIG. 3 is an end view in partial cross section of the electrobalance device shown in FIGS. 1 and 2.

Referring now to the drawings and particularly to FIGS. 1, 2 and 3 there is shown an electrobalance device embodying the present invention. A vacuum chamber 10 includes a port 11 and a shutoff valve 12. A vacuum pump may be attached to the port 11 for evacuating chamber 10. The vacuum chamber 10 also includes a similar port 13 and a shutoff valve 14 through which may be introduced a subject gas whose density is to be measured.

Within chamber 10 there is located a balance arm or beam 15 which is adapted to be pivotally mounted on a fixed fulcrum 16. A counterbalance weight 17 is suspended by hangdown wire 18 from one end 20 of beam 15. In this example, a buoyant body or hollow sphere 21 is suspended by hangdown wire 22 from the other end 23 of beam 15.

The system may be placed in balance by properly selecting the weight if the counterbalance weight 17 is equal to the weight of the hollow sphere 21, provided that the moment arm between the fulcrum 16 and the one end 20 is equal to the moment arm between the fulcrum 16 and the other end 23. Also, it is evident that if material is added to or taken away from either the counterbalance weight 17 or the hollow sphere 21, the balance of the system will be disturbed and the beam 15 will incur angular displacement about the fulcrum 16. It is further evident that since the hollow sphere 21 has definite buoyant characteristics, if the density of the media surrounding the hollow sphere 21 changes, the force exerted by the hollow sphere 21 on hangdown wire 22 will then change and the balance of the system will again be disturbed.

The beam disturbance, which is an angular displacement of beam 15, may be noted as by a dual element displacement sensing apparatus 24, 25. In this example, the apparatus 24, 25 comprises a photoelectric sensing system wherein element 24 includes a light source directed to impinge light upon a light sensing device 26 of the element 25. These elements 24, 25 are positioned adjacent or juxtaposed the one end 20 of beam 15 such that when beam 15 is in balance at a neutral or nominal position the one end 20 interrupts a maximum portion of the light beam passing from the light source element 24 to the light sensor 26 of the element 25. With increasing amounts of beam displacement there is a corresponding increase in the amount of light reaching the light sensor 26. The photoelectric apparatus 24, 25 is designed and adapted for producing an output signal from element 25 which is representative of the beam displacement.

The signal is impressed upon a servomechanism 26 which in turn is linked as indicated at 27 to the beam 15. The servomechanism 26 is designed and adapted for applying a counterbalancing torque to the beam 15 and thereby maintain the beam at a substantially zero displacement or nominal condition. The voltage or current associated with the applied counterbalancing torque may be measured and is indicative of any apparent weight change in the hollow sphere 21. The electrobalance device of the type therein described has very linear measurement characteristics and is generally considered to be a very accurate measuring system.

As heretofore indicated buoyant forces acting upon the hollow sphere 21 will result in an apparent weight change which may be measured by the electrobalance system. It is well known that the buoyant force exerted by a media on a body is a function of the volume of media displaced by the body and the density of the media. Since the volume of the hollow sphere 21 may be determined and the electrobalance device measures the buoyant force, the density of the media within the vacuum chamber 10 may be determined. The effects of sorption and adsorption may also be studied since these phenomena will cause an apparent or actual weight change in the hollow sphere 21. The forces to be detected by the system are understandably very small. Applicant has found that an electrobalance device can be constructed having a sensitivity to approximately $10^{14}$ torr which is substantially more accurate than devices now in use.

The displacement sensing apparatus 24, 25 of FIGS. 1, 2 and 3 which is used for detecting displacement of beam 15 has associated therewith electronics and light source both of which may be a source of heat. Such a source of heat directly affects the one end 20 of beam 15 by elevating the temperature thereof. This creates a temperature gradient along the beam 15 and results in a longer moment arm between the fulcrum 16 and the one end 20 than between the fulcrum 16 and the other end 23. The differential in moment arms will itself cause the beam to be angularly displaced which will falsely indicate a change in the weight of the object or in the buoyant force being measured.

Another temperature associated problem exists when an electrobalance is used in a hard vacuum wherein thermal molecular effects will become more predominate. It will be appreciated that due to the heat source adjacent the one end 20 of the beam 15, the molecules in the vicinity of the one end 20 receive thermal energy as evidenced by increased kinetic energy which then may be imparted to the counterbalancing weight 17 by collision therewith. The continued bombardment from above of the counterbalance weight 17 by relatively high energy molecules will tend to exert more downward force on the counterbalance weight 17 than is exerted on the hollow sphere 21. The system may therefore become unbalanced resulting in a displacement of beam 15 which again falsely indicates the forces being measured.

In view of the foregoing, the electrobalance of the present invention includes a temperature detector or sensor 30 positioned near the one end 20 of the beam 15.

Associated with these temperature sensors 30, 31 is a chamber generally designated 32 within which there is located temperature compensating circuitry which will be hereinafter described. This circuitry includes the two temperature sensors 30, 31. The chamber 32 is designed and adapted for becoming a source of heat which will substantially duplicate the radiation pattern of the displacement sensing apparatus 24, 25. The chamber 32 also has an exterior configuration substantially the same as the displacement detection apparatus 24, 25 so as to present to those molecules in the vicinity of the hollow sphere 21 substantially the same environmental conditions as those molecules in the vicinity of counterbalance weight 17. The chamber 32 has a first portion 32a which corresponds to the element 24 which contains the primary heat source. A second portion 32b of chamber 32 corresponds to the other element 25 which is a source of relatively little or no heat. In this example of the invention, a heat source may be located in portion 32a of chamber 32 and some of the heat allowed to travel by conduction through interconnecting passageway 32c so as to make the other portion 32b of chamber 32, a relatively small source of heat. Of course, interconnecting passageway 32c may be omitted and a second source of heat located in the second portion 32b.

Figure 4:
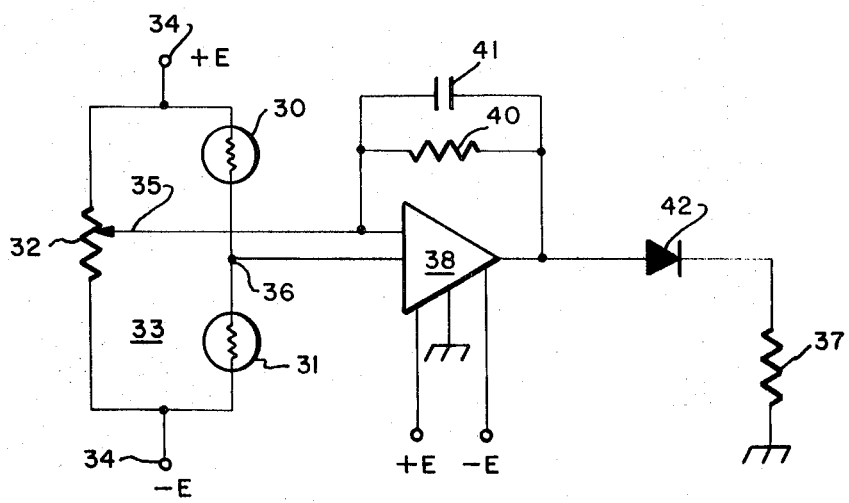
FIG. 4 is a circuit diagram of the temperature compensating means included in the electrobalance device for FIGS. 1, 2 and 3.

Turning now to FIG. 4 there is shown a temperature compensating circuit suitable for the practice of the invention as described herein and which may be located within chamber 32. There is generally shown at 33 a temperature detector for producing a signal representative of the temperature difference between the two ends of beam 15. The temperature detector 33 may be a bridge circuit or network and includes the two temperature sensors 30, 31 each of which forms one leg of the bridge network. In this example of the invention, the temperature sensors 30, 31 are thermistors and as such are resistive elements. The other two legs of the bridge network may be formed by the potentiometer 32. A voltage source may be connected across the input terminals 34, 34 and the output of the bridge taken across the remaining terminals 35, 36. The output of the bridge network is of course indicative of the temperature difference existing between the ends of the beam 15.

The bridge network output terminals are coupled to, and the bridge output controls, directly or indirectly, a heat generator 37 which in FIG. 4 is shown simply as a resistive heater element. As further shown in FIG. 4, energy transfer means 38 is coupled between the bridge network and the heating element and consist of an operational amplifier to take advantage of its low output and high input impedance characteristics. Since the amplifier 38 has high impedance, very little current will be drawn from the bridge network, and since the output impedance is very low, the heat generator 37 will be substantially isolated from the detection network. In accordance with well-known circuit techniques, a feedback resistor 40 is included as in a capacitor 41 for stability control.

When temperature sensor 30 is at a higher temperature than the other temperature sensor 31, the bridge is unbalanced and output voltage will operably cause the operational amplifier 38 to feed corresponding amounts of current to the heat generator 37. The greater the bridge unbalance the greater will be the current drawn by the generator 37. If, however, the temperature sensor 31 is at a higher temperature than sensor 30, it is not desirable to have the heat generator draw any current, therefore, a blocking diode 42 is introduced into the circuit. These latter conditions exists when the one end 20 of beam 15 is cooler than the other end 23. Under such conditions, conduction and radiation is relied upon to equalize the temperatures along the beam since these conditions should only occur as a result of slight overcompensation by the system.

Figure 5:
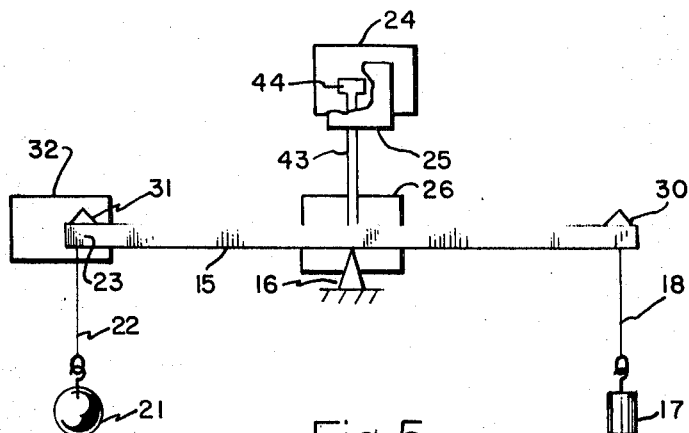
FIG. 5 is a partial view of the electrobalance shown in FIG. 1 showing an alternative embodiment.

As an alternative to the foregoing, and provided space conditions permit, the electrobalance may be modified as shown in FIG. 5. The electrobalance arm of FIG. 1 is shown in FIG. 5, however, the displacement sensing apparatus, elements 24, 25, are located above and geometrically midway, above or below, between the ends of the beam 15 and a post 43 carries a flag 44. The angular displacement of beam 15 causes a corresponding angular displacement of the post 43 and flag 44, thus, the flag 44 interrupts the light beam in varying amounts to produce a voltage or current representative of the beam displacement. The geometric symmetry will, of course, tend to equalize the effect of the heat produced by elements 24, 25. In this arrangement the compensating heat source, chamber 32, may be positioned near one end of the beam 15 or may consist of two portions positioned at opposite ends of the beam.

I claim:

1. An electrobalance device of the type having a beam pivotally mounted at a fulcrum, means for suspending a weight from the beam, means for detecting a displacement of the beam, which includes source of heat, and a servosystem responsive to the detection means for applying a counterbalancing torque to the beam to reduce any beam displacement toward zero, comprising:
   a. a temperature detector associated with the beam for sensing whether or not the temperature at one end of the beam exceeds the temperature at the other end of the beam, and for producing an output signal representative of any such temperature difference; and
   b. a heat generator coupled to said temperature detector, and positioned adjacent said other end of the beam, and further being operatively responsive to said signal from said temperature detector, thereby to elevate the temperature of said other end of the beam to the temperature of said one end so as to maintain the ends of the beam at substantially equal temperatures.

2. The electrobalance device of claim 1 further comprising: energy transfer means responsive to an input signal and coupled between said temperature detector and said heat generator for transferring energy to said heat generator in response to said signal from said temperature detector.

3. The electrobalance of claim 2 wherein said temperature detector includes:
a bridge network having a first temperature sensor positioned to sense the temperature at said one end of the beam and forming one leg of said bridge network, and a second temperature sensor positioned to sense the temperature at said other end of the beam and forming another leg of said bridge network, said network being arranged to provide an output signal representative of the temperature difference between said ends of the beam.

4. The electrobalance of claim 3 wherein said bridge network is resistance in character.

5. The electrobalance of claim 4 wherein said first and second temperature sensors are thermistors.

6. The electrobalance of claim 2 wherein said energy transfer means includes:
an operational amplifier having the signal input terminals coupled to said temperature detector for impressing said output signal on said amplifier, said amplifier further having power connections to which a voltage source may be connected, said amplifier being designed to supply varying amounts of current to said heat generator in response to said temperature detector output signal.

7. The electrobalance device of claim 6 wherein said heat generator includes an electrical heater element.

8. The electrobalance device of claim 7 further comprising:
a blocking diode coupled between said operational amplifier and said heater element for permitting current to be directed only from said amplifier to said heater element when a temperature increase is indicated.

9. An electrobalance system comprising;
   a. a fulcrum;
   b. a beam pivotally mounted on said fulcrum;
   c. a beam displacement sensor juxtaposed one end of said beam, said sensor including a source of radiant heat and further being designed and adapted for producing an output displacement signal representative of said beam displacement;
   d. a servomechanism responsive to said output signal for applying a counterbalancing torque to said beam to maintain said beam at substantially zero displacement;
   e. a temperature detector associated with said beam for sensing whether or not the temperature at said one end of said beam exceeds the temperature at the other end of said beam, and for producing an output signal representative of any such temperature difference; and
   f. a heat generator coupled to said temperature detector, and positioned adjacent said other end of the beam, and further being operatively responsive to said signal from said temperature detector, thereby to elevate the temperature of said other end of the beam to the temperature of said one end so as to maintain the ends of the beam at substantially equal temperatures.

10. The electrobalance system of claim 9 further comprising:
a buoyant body suspended form said beam whereby the buoyant forces on said body may be measured.

11. The electrobalance system of claim 10 further comprising:
a vacuum tight enclosure for housing said system whereby the buoyant force of a gas on said buoyant body may be studied.

12. The electrobalance system of claim 11 wherein said temperature detector includes:
a bridge network having a first temperature sensor positioned to sense the temperature at said one end of the beam and forming one leg of said bridge network, and a second temperature sensor positioned to sense the temperature at said other end of the beam and forming another leg of said bridge network, said network being arranged to provide an output signal representative of the temperature difference between said ends of the beam.

13. The electrobalance system of claim 12 wherein said bridge network is resistive in character.

14. The electrobalance device of claim 13 wherein said first and said second temperature sensors are thermistors.

15. The electrobalance system of claim 11 wherein said energy transfer means includes:
an operational amplifier having the signal input terminals coupled to said temperature detector for impressing said output signal on said amplifier, said amplifier further having power connections to which a voltage source may be connected, said amplifier being designed to supply varying amounts of current to said heat generator in response to said temperature detector output signal.

16. The electrobalance system of claim 15 wherein said heat generator includes an electrical heater element.

17. The electrobalance system of claim 16 further comprising:
a blocking diode coupled between said operational amplifier and said heater element for permitting current to be directed only from said amplifier to said heater element to provide heating current only when indicated.

18. The electrobalance system of claim 11 further comprising:
   a. a first housing for enclosing at least a portion of said beam displacement sensor; and
   b. a second housing for enclosing said heat generator and being shaped and oriented to substantially duplicate the heat radiating surfaces of said first housing, thereby presenting substantially the same heat radiation pattern at each of said ends of said beam.

* * * * *